United States Patent [19]

Stallkamp

[11] Patent Number: 4,827,250
[45] Date of Patent: May 2, 1989

[54] GRAPHICS DISPLAY SYSTEM HAVING DATA TRANSFORM CIRCUIT

[75] Inventor: Richard W. Stallkamp, Tigard, Oreg.

[73] Assignee: Tektronix, Inc., Beaverton, Oreg.

[21] Appl. No.: 113,027

[22] Filed: Oct. 26, 1987

[51] Int. Cl.$^4$ .............................................. G09G 1/16
[52] U.S. Cl. .................................... 340/727; 340/723; 340/731; 340/747
[58] Field of Search ............... 340/724, 727, 747, 799, 340/723, 731, 728; 364/518, 521

[56] References Cited

U.S. PATENT DOCUMENTS

| Re. 31,200 | 4/1983 | Sukonick et al. | 340/724 |
| 3,723,803 | 3/1973 | Harrison et al. | 340/724 |
| 4,384,286 | 5/1983 | Di Toro | 340/727 |
| 4,590,465 | 5/1986 | Fuchs | 340/727 |

OTHER PUBLICATIONS

Antwick, "Microcomputers Displays, Graphics, and Animation", Prentice-Hall, 1985, p. 304.

Primary Examiner—Donald J. Yusko
Assistant Examiner—Alvin Oberley
Attorney, Agent, or Firm—Mark M. Meininger; Robert S. Hulse

[57] ABSTRACT

A graphics display system (10) includes a display screen (14) on which images are formed and a data transform circuit (12) that provides transformations between model data representing the basic shape of an object and display data that are employed in the formation of an image of the object on the display screen. The model data are transformed into display data in accordance with position data and orientation data that correspond, respectively, to a translation and a rotation of the image on the display screen. The data transform circuit communicates with a central processing unit (30) that controls the operation of the graphics display system. The data transform circuit includes data storage registers (34, 36, 38, 40, 42, 44, 46) that receive and hold the model, position, and orientation data. A multiplier circuit (68) and an adder circuit (112) calculate the transformation of the model data into display data. A data transform controller circuit (50) controls the transfer of data from the data storage registers to the multiplier and adder circuits so that the transformation takes place at a relatively high speed. The data transform circuit of this invention allows the transformation to proceed without delays such as those caused by the repetitive transfer of output data back to the inputs of an arithmetic logic unit.

13 Claims, 2 Drawing Sheets

GRAPHICS DISPLAY SYSTEM HAVING DATA TRANSFORM CIRCUIT

TECHNICAL FIELD

The present invention relates to graphics display systems having display screens on which images are formed and, in particular, to such a system that includes a data transform circuit that transforms model data representing the basic shape of an object into display data employed in forming on the display screen an image of the object.

BACKGROUND OF THE INVENTION

Model data represent the basic shape of an object an image of which is formed on the display screen of a two- or three-dimensional graphics display system. The model data are typically generated by a computer that is connected to the graphics display system and are defined with respect to a reference position in a spatial coordinate system of two or three dimensions.

Locations on a display screen of a two-dimensional graphics display system are typically identified by a Cartesian coordinate system having its origin located at the lower left corner of the display screen and its X- and Y-axes corresponding to horizontal and vertical directions, respectively. In such a system, an image rendered on the display screen in accordance with only the model data would represent the basic shape of the object positioned at the reference position (e.g., the origin) of the coordinate system. For example, an image produced from model data representing a square would appear on the display screen as a square having its lower left corner positioned at the origin and its sides aligned with the X- and Y-axes.

It is necessary to transform the model data into display data to provide on the display screen an image having the basic shape of the object in different positions and orientations. The display data are typically generated by transforming the model data in accordance with position data, orientation data, and scaling data. The position data provide a translation of the image of the object from the origin to some other position on the display screen. The orientation data provide a rotation of the image of the object so that the image is not necessarily aligned with the X- and Y-axes of the coordinate system. The scaling data provide a preselected size to the image and are often incorporated into the orientation data to reduce the number of calculations involved in transforming the model data into display data.

The model, orientation, and position data are typically arranged in linear algebraic matrix format with the scaling data incorporated into the orientation data. The transformation of the model data in accordance with the orientation data and position data is sometimes performed by means of matrix multiplication and addition, respectively.

Graphics display systems are typically controlled by the central processing unit of a computer. Calculations performed in transforming the model data into display data are accomplished by an arithmetic logic unit that is incorporated in the central processing unit. Alternatively, large scale calculations such as the transformation of model data into display data are performed by an arithmetic logic unit of a coprocessor that is connected to the central processing unit.

Arithmetic logic units are designed to selectively perform any one of a variety of basic arithmetic operations. Since all arithmetic operations entail manipulations between two numerical terms, arithmetic logic units typically have only two numerical inputs. The speed at which an arithmetic logic unit performs calculations employing three or more numerical terms is, therefore, limited by the speed at which data signals are delivered to and transferred from the arithmetic logic unit.

For example, to calculate a non-matrix, numerical equation of the form $U \times V + W$, an arithmetic logic unit receives at its two numerical inputs data signals that represent the values of the terms U and V. The arithmetic logic unit calculates the product of these terms and delivers a data signal representing this product to its output storage register. Data signals representing the product and the term W are then transferred to the two numerical inputs of the arithmetic logic unit, which calculates the result.

The transfer of the data signal representing the product to the output storage register and then to the input of the arithmetic logic unit is a relatively slow process. Such transfers are, however, necessary whenever an arithmetic logic unit performs calculations that include three or more numerical terms because the arithmetic logic unit has only two numerical inputs.

The transformation of model data into display data employs a linear algebraic matrix equation of the form $P_D = P_M \times R + T$, in which the matrices $P_D$, $P_M$, R, and T represent display, model, orientation, and position data, respectively. Since each of these matrices typically includes multiple nonzero elements, the transformation of model data into display data typically employs many more than two numerical terms. As a result, the transformation of model data into display data by an arithmetic logic unit is a relatively slow process.

SUMMARY OF THE INVENTION

An object of this invention is, therefore, to provide a graphics display system having a data transform circuit that transforms model data into display data.

Another object of this invention is to provide such a system that is capable of performing data transformations at relatively high speeds.

A further object of this invention is to provide such a system that is capable of forming on its display screen images representing two- or three-dimensional objects.

The present invention is a graphics display system that includes a display screen on which images are formed and a data transform circuit that provides relatively rapid transformations between model data representing the basic shape of an object and display data employed in the formation of an image on the display screen.

In a preferred embodiment, locations on the display screen are identified by a two-dimensional Cartesian coordinate system having its origin positioned at the lower left corner of the display screen and its X- and Y-axes corresponding to horizontal and vertical directions, respectively. The model data are defined with respect to the origin of the coordinate system. The display data are generated by transforming the model data in accordance with position data, orientation data, and scaling data. The position data provide a translation of the image of the object from the origin to some other position on the display screen. The orientation data provide a rotation of the image of the object so that the image is not necessarily aligned with the X- and Y-axes of the coordinate system. The scaling data provide a preselected size to the image and are incorporated into the orientation data.

The model and display data include multiple points on the display screen. The position coordinates of each of the points in the model and display data are represented by linear algebraic matrices $P_M$ and $P_D$, respectively. Similarly, the orientation data and the position data are represented by linear algebraic matrices R and T, respectively. The transformation of a point in the model data $P_M$ into a point in the display data $P_D$ is represented by a well-known matrix equation of the form $P_D = P_M \times R + T$.

For example, in a two-dimensional graphics display system that forms on its display screen images of two-dimensional models, the matrix equation for the transformation of a point (X, Y) in the model data $P_M$ into a point (X', Y') in the display data $P_D$ generates for the X' and Y' coordinates a general non-matrix equation $S = X \times A + K + Y \times B$. The term S represents one of the coordinates X' and Y' in the display data $P_D$; the terms A and B represent the orientation data corresponding to the one of the X' and Y' coordinates; and the term K represents the position data corresponding to the one of the X' and Y' coordinates. The transformation of model data into display data takes place, therefore, in a point-by-point and coordinate-by-coordinate fashion.

The data transform circuit in such a two-dimensional graphics display system preferably includes data storage registers for the data signals representing the values of the terms X, Y, A, B, and K. Different values of the terms A, B, and K are typically employed in generating the coordinates X' and Y'. As a result, two transformation calculations are required to generate a point (X', Y') in the display data from a point (X, Y) in the model data.

Whenever the transformation is calculated in sequence from the left-end to the right-end of the general non-matrix equation, the data storage registers for at least the terms X, A, and K must receive their corresponding data signals before the commencement of the transformation calculation so that the calculation may proceed without an interruption stemming from the transfer of data into a storage register.

The data transform circuit includes a multiplier circuit that is connected in series with an adder circuit. In a first calculation, the multiplier circuit receives the data signals representing, and calculates the product of, the terms X and A relating to the display data coordinate X'. Data signals representing the product and the term K are then applied directly to the adder circuit, which generates a signal representing the term $X \times A + K$. This signal is held in a data storage register while the multiplier circuit calculates the product of the terms Y and B. The signal representing the terms $Y \times B$ is applied directly to the adder circuit together with the term $X \times A + K$, so that the adder circuit generates a signal representing the X' coordinate. In a second calculation, the terms A, B, and K relating to the display data coordinate Y' are employed in a manner similar to that described above for the coordinate X' to generate a signal representing the Y' coordinate.

The operation of the image transform circuit is controlled by a data transform circuit controller unit. The controller unit provides a steady flow of data signals to and between the multiplier and adder circuits. As a result, the data transform circuit of this invention allows the data transformation calculations to proceed without the delays caused by the repetitive transfer of output data back to the inputs of an arithmetic logic unit.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

Figure 1:
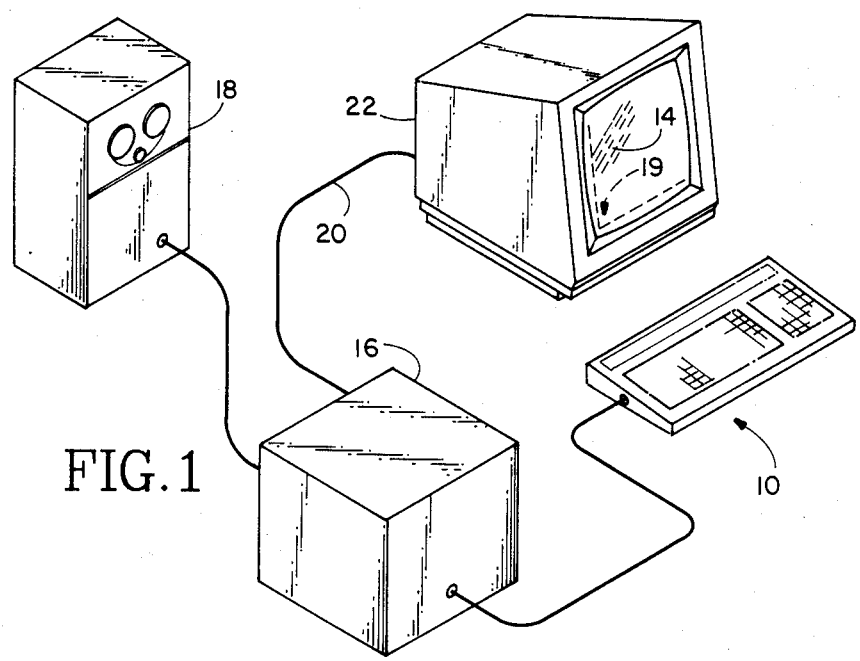
FIG. 1 is a diagrammatic representation of a graphics display system.

FIG. 1 shows a two-dimensional graphics display system 10 that employs a data transform means or circuit 12 (FIG. 2) of the present invention for rendering on a display screen 14 an image representing a two-dimensional model of a physical object. Although the data transform circuit of the present invention is compatible with both two- and three-dimensional graphics display systems, it is described herein with respect to a two-dimensional system for purposes of simplicity. Display system 10 can be used, for example, in connection with a mechanical engineering computer-aided design system.

Data transform circuit 12 is included in a display controller unit 16 that receives model data representing the basic shape of an object that is being imaged. The model data are transmitted from an information source such as, for example, a host computer 18. The information source can also comprise a disk drive, a telecommunication data link, or a local memory circuit within display system 10.

The model data are defined with respect to a reference position in a spatial coordinate system such as a Cartesian coordinate system having its origin located at the lower left corner of display screen 14 and its X- and Y-axes 19 (shown in phantom) corresponding to horizontal and vertical directions, respectively. The model data typically correspond to an image that is aligned. Data transform circuit 12 employs position data, orientation data, and scaling data to transform the model data into display data. The position data provide a translation of the image of the object from the reference position to some other position on the display screen. The orientation data provide a rotation of the image of the object so that the image is not necessarily aligned with X- and Y-axes 19. The scaling data provide a preselected size to the image and are incorporated into the orientation data, as will be described below in greater detail. The display data are employed by display controller unit 16 to generate control signals that are applied to a display data link 20 to direct a cathode-ray tube 22 to form on display screen 14 graphics display images in accordance with the model, position, and orientation data.

The model, orientation, and position data are arranged in linear algebraic matrix format, and the transformation of the model data in accordance with the orientation and position data can be performed by means of a matrix multiplication and addition, respectively. The transformation of a point in the model data $P_M$ into a point in the display data $P_D$ is represented by a well-known linear algebraic matrix equation of the form $P_D = P_M \times R + T$, in which the matrices R and T represent orientation and position data, respectively. In a two-dimensional graphics display system, points in the display data $P_D$ and the model data $P_M$ are represented by coordinates (X', Y') and (X, Y), respectively, the matrix T is represented as (dX, dY) designating translations or offsets in the X and Y directions, and the matrix R is represented as:

$$\begin{vmatrix} \text{scalex} \times \cos\theta & \text{scalex} \times \sin\theta \\ \text{scaley} \times -\sin\theta & \text{scaley} \times \cos\theta \end{vmatrix},$$

which designates a rotation of the model by an amount equal to the term "$\theta$" with scaling in the X- and Y-directions by the scaling terms scalex and scaley, respectively.

The matrix equation $P_D = P_M \times R + T$ generates the X' and Y' coordinates of a point (X', Y') in the display data $P_D$ from a point (X, Y) in the model data $P_M$ in accordance with the respective transformation equations:

$$X' = X \times \text{scalex} \times \cos\theta - Y \times \text{scaley} \times \sin\theta + dX;$$

and $$Y' = X \times \text{scalex} \times \sin\theta + Y \times \text{scaley} \times \cos\theta + dY.$$

The transformation equations are of a general form that can be represented as:

$$S = X \times A + K + Y \times B,$$

where the term S represents one of the coordinates X' and Y' of a point (X', Y') in the display data $P_D$, A is the corresponding one of the terms $\text{scalex} \times \cos\theta$ and $\text{scalex} \times \sin\theta$, B is the corresponding one of the terms $\text{scaley} \times -\sin\theta$ and $\text{scaley} \times \cos\theta$, and K is the corresponding one of the terms dX and dY.

The model data employed in graphics display system 10 are defined in a Cartesian coordinate space having X and Y values that are represented by 32-bit binary numbers. To provide greater accuracy in calculations involving the 32-bit binary numbers, each of the terms X, A, Y, B, and K is represented by a 48-bit binary number.

The multiplication of 48-bit numbers can generate results of up to 96 bits in length, but graphics display system 10 represents numerical terms in 48-bit lengths. It is necessary, therefore, to select from calculations such as the transformation equation, the 48 bits of the result that are the most pertinent to the calculation. To select the most pertinent bits, the general form of the transformation equation is modified to include terms A count and B count (designated in equations as Acnt and Bcnt, respectively). The A count and B count terms are incorporated into the transformation equation of general form as follows:

$$S = X \times A \times 2^{(48-Acnt)} + K + Y \times B \times 2^{(48-Bcnt)}$$

The A count and B count terms normalize products generated by fixed point calculations, as will be described in greater detail hereinbelow.

The values of the functions cosine and sine are zero at alternate integer multiples of the angle 90°, thereby simplifying the transformation equations. In particular, one of the terms A and B is zero at angles that are integer multiples of 90°, which results in a general, simplified transformation equation for rotations involving these angles. The simplified transformation equation is:

$$S = Z \times C + K,$$

where S is one of the coordinates X' and Y' of the display data $P_D$, Z is one of the coordinates X and Y of the model data $P_M$, and C is the nonzero one of the terms A and B (including the respective terms $2^{(48-Acnt)}$ and $2^{(48-Bcnt)}$) represented in the general transformation equation.

Figure 2:
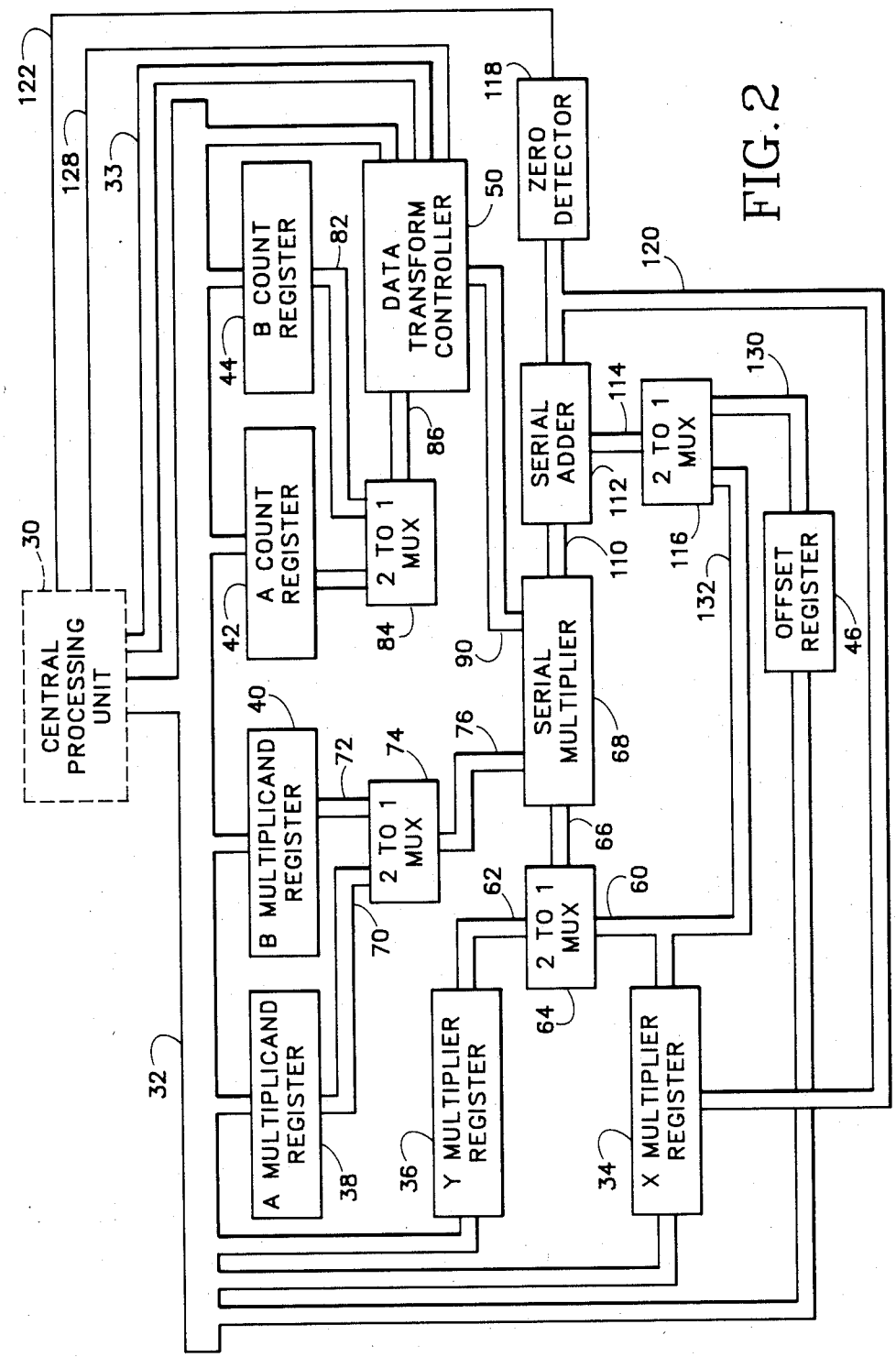
FIG. 2 is a block diagram of a data transform circuit of the present invention.

FIG. 2 is a block diagram showing data transform circuit 12 electrically connected to a central processing unit 30 (shown in phantom) of display controller unit 16. Data transform circuit 12 is preferably a CMOS gate array integrated circuit. Central processing unit 30 may be, for example, a Model 80286 microprocessor manufactured by Intel Corporation or a custom designed bit slice processing system. Central processing unit 30 controls the operation of graphics display system 10.

Data transferred between central processing unit 30 and data transform circuit 12 are transmitted over a 16-bit parallel bidirectional data bus 32. Whenever model, orientation, and position data are directed by way of data bus 32 from central processing unit 30 to data transform circuit 12, corresponding register addresses are transmitted over a 4-bit parallel register address bus 33.

An X multiplier data storage register 34, a Y multiplier data storage register 36, an A multiplicand data storage register 38, a B multiplicand data storage register 40, an A count data storage register 42, a B count data storage register 44, and an offset data storage register 46 are electrically connected to data bus 32 for receiving the model, orientation, and position data. Data storage registers 34, 36, 38, 40, 42, 44, and 46 receive from central processing unit 30 data signals representing the values of the terms X, Y, A, B, A count, B count, and offset, respectively. Electrically connected to register address bus 33 for receiving the register addresses is a data transform controller circuit 50. Descriptions of the register addresses are set forth in Table I.

Table I lists descriptions of the data storage registers in data transform circuit 12. Addresses listed in Table I are transmitted by way of register address bus 33 to controller circuit 50, which activates the appropriate register in response to a register address. Control signal conductors between controller circuit 50 and other components of data transform circuit 12 are not shown for purposes of clarity.

With reference to Table I and FIG. 1, each of data storage registers 34 and 36 is of the READ/WRITE type and includes three 16-bit data addresses for storing the 48-bit signals corresponding to the X and Y multiplier terms, respectively. A functional difference between data storage registers 34 and 36 is that register 36 stores the Y multiplier term before multiplication and is undefined afterward; whereas register 34 stores the X multiplier term before multiplication and a result term after addition, as well be described below in greater detail.

Data storage registers 38, 40, and 46 receive three 16-bit signals corresponding to the A multiplicand, B multiplicand, and offset terms, respectively. Data storage registers 38 and 40 are of the WRITE only type, and data storage register 46 is of the READ/WRITE type. Data storage registers 38 and 40 are selected with respective data storage registers 42 and 44 in accordance with control register addresses (address D) that are directed to data transform controller circuit 50 and are described in Table II. Registers 38 and 40 are of the 16-bit WRITE only type. Registers 42 and 44 are of the 8-bit WRITE only type. Controller circuit 50 includes a 4-bit READ/WRITE type register. The upper-level bits in a 16-bit word are ignored by the register in controller circuit 50 and by registers 42 and 44.

TABLE I

| NAME | ADDRESS | TYPE | DESCRIPTION |
|---|---|---|---|
| X Lo | 0 | Read/Write | Low 16 bits of X before multiply, low 16 bits of result after addition. |
| X Mid | 1 | Read/Write | Middle 16 bits of X before multiply, middle 16 bits of result after addition. |
| X Hi | 2 | Read/Write | Upper 16 bits of X before multiply, upper 16 bits of result after addition. |
| Y Lo | 3 | Write | Low 16 bits of Y before multiply, undefined after multiply. |
| Y Mid | 4 | Write | Middle 16 bits of Y before multiply, undefined after multiply. |
| Y Hi | 5 | Write | Upper 16 bits of Y before multiply, undefined after multiply. |
| A/B Lo | 6 | Write | Low 16 bits of A or B. |
| A/B Mid | 7 | Write | Middle 16 bits of A or B. |
| A/B Hi | 8 | Write | Upper 16 bits of A or B. |
| A/B Cnt | 9 | Write | 8 bit count for A or B (upper 8 bits ignored). |
| Off Lo | A | Read/Write | Low 16 bits of offset. |
| Off Mid | B | Read/Write | Middle 16 bits of offset. |
| Off Hi | C | Read/Write | Upper 16 bits of offset. |
| Control | D | Read/Write | 4 bits of control register (upper 12 bits ignored). |
| RESERV1 | E | | RESERVED |
| RESERV2 | F | | RESERVED |

Table II lists descriptions of the signals carried on four of 16 available bits that controller circuit 50 receives over register address bus 33 in connection with the control register (i.e., address D, Table I). Controller circuit 50 employs the signals in controlling the operation of data transform circuit 12. Bit 0 carries an A/B signal that is used to select between the data storage registers directed to the A multiplier and A count terms (i.e., registers 38 and 42) and the data storage registers directed to the B multiplier and B count terms (i.e., registers 40 and 44). Bit 1 carries an ENOFF signal that enables the addition of an offset term. Bit 2 carries an ENRND signal that enables rounding of the value generated by the transformation calculation. Bit 3 carries a ROTATE signal that selects between first and second operating modes of data transform circuit 12 depending on whether or not, respectively, the angle of rotation in the orientation data is equal to an integral multiple of 90°.

Data storage registers 34 and 36 are electrically connected to respective inputs 60 and 62 of a two-to-one multiplexer circuit 64, which provides a signal representing one of the X and Y multiplier terms to a first input 66 of a serial multiplier circuit 68. Data storage registers 38 and 40 are connected to respective inputs 70 and 72 of a two-to-one multiplexer circuit 74, which provides a signal representing one of the A and B multiplier terms to a second input 76 of multiplier circuit 68.

Data storage registers 42 and 44 are electrically connected to respective inputs 80 and 82 of a two-to-one multiplexer 84, which provides a signal representing one of the A count and B count terms to an input 86 of data transform controller circuit 50. Controller circuit 50 generates from, for example, the A count term, a signal representing the term $2^{(48-Acnt)}$, which signal is applied to an input 90 of multiplier circuit 68.

The basic operation of data transform circuit 12 is divided into two modes. The first mode is selected whenever the ROTATE signal (Table II) is in a LOW state. The first mode is directed to rotations of an image of an object on display screen 14 by an angle that is an integer multiple of 90°. The first mode employs the simplified transformation equation: $S = Z \times C + K$. The first mode performs, therefore, one multiplication relating to rotation and an offset addition relating to translation of the image.

The loading of the 16-bit X Hi multiplier term into register 34 initiates the first mode. All other registers that are required in this mode must be loaded, in any order, before starting the calculation. Data storage registers 34, 38 and 42 receive data that are directed to the X Lo, X Mid, A Lo, A Mid, A Hi, and A Count registers. Whenever the ENOFF register (Table II) of the control register is set to a HIGH signal level, offset addition is enabled and data storage register 46 receives data that are directed to the Off Lo, Off Mid, and Off Hi registers. An output conductor 128 between controller circuit 50 and central processing unit 30 carries a busy signal or flag that goes active when the X Hi term is loaded, and remains active until the transformation calculation is completed.

TABLE II

| BIT | NAME | DESCRIPTION |
|---|---|---|
| 0 | A/B | A or B register select. HIGH sets A/B accesses to A register. |
| 1 | ENOFF | Enable offset addition. HIGH enables addition. |
| 2 | ENRND | Enable rounding. HIGH rounds result. If HIGH and upper bit of remainder is 1 then the result is incremented by one. |
| 3 | ROTATE | One or two multiplies. HIGH sets two multiply mode. |
| 4-15 | RESERVED | |

In the first mode, signals representing the terms X, A, and $2^{(48-Acnt)}$ are applied to the respective inputs 66, 76, and 90 of multiplier circuit 68, which generates by means of a 2-bit Booth multiplication algorithm a product signal representing the product $X \times A \times 2^{(48-Acnt)}$. The useful range of values for the A count term is within about 48 to 145. For example, a value of 48 for the A count term will result in the equation representing an integer multiplication. Values of the term A count greater than 48 correspond to the quotient of the product $X \times A$ divided by the term $2^{(Acnt-48)}$, which transfers the decimal point of the integer product to the left so that the preferred bits in the result fall within the 48-bit range.

The product signal generated by multiplier circuit 68 is applied to a first input 110 of a serial adder circuit 112. Whenever the ENOFF signal (Table II) is set to a HIGH level, offset addition is enabled and a second input 114 of adder circuit 112 receives a signal representing the offset term. The offset term is received from a two-to-one multiplexer circuit 116 having an input 130 to which data storage register 46 is connected and directs the offset term. Adder circuit 112 receives, therefore, signals representing the product $X \times A \times 2^{(48-Acnt)}$ and the offset term dX, and generates a sum signal representing the sum $X \times A \times 2^{(48-Acnt)} + dX$.

The sum signal is transmitted to a zero detector circuit 118 and over a conductor 120 to data storage register 34. Register 34 stores the sum as a result as indicated in Table I. The result is then transferred from storage register 34 by way of data bus 32 to central processing unit 30, thereby to be employed in the generation of an image on display screen 14.

Zero detector circuit 118 determines whether the upper 33 bits (32 numerical bits and 1 sign bit) of the pertinent 48-bit result are zero. If they are, zero detector circuit 118 delivers HIGH flag signal to an output 122 that is connected to central processing unit 30. Whenever display screen 14 employs a 16 bit-by-16 bit portion of the coordinate space as the active display area, a HIGH flag signal indicates that the result is a 16-bit number that corresponds to a location in the active display area. A LOW flag signal indicates, therefore, that the result does not correspond to a location in the active display area.

Whenever the ENOFF signal is set to a LOW level, offset addition is disabled and the product signal passes through adder circuit 112, over conductor 118, and to storage register 34. The product signal is then transferred from storage register 34 to central processing unit 30.

The second mode is directed to rotations of an image by arbitrary angles and is selected whenever the ROTATE signal is in a HIGH state. The second mode employs the general transformation equation and performs, therefore, two rotation multiplications and an offset addition. As with the first mode, the loading of the 16-bit X Hi multiplier term in register 34 starts the second mode. The second mode proceeds in a manner similar to that of the first mode, up to the storage of the sum signall in data storage register 34. In the second mode, this sum signal is designated a partial sum signal that includes all but the Y, B, and B count terms of the result.

In the second mode, the storage of the partial sum signal in data storage register 34 allows the second rotation multiplication to proceed. In particular, signals corresponding to the Y, B, and B count terms are loaded into their corresponding data storage registers before, during, or after the generation of the first product signal.

The generation of a second product signal by multiplier circuit 68 for the Y, B, and B count terms occurs in a manner similar to the generation of the product signal for the X, A, and A count terms. The second product signal is applied to input 110 of adder circuit 112 and the partial sum term is applied to an input 132 of multiplexer circuit 116, which delivers the partial sum term to input 114 of adder circuit 112. Adder circuit 112 generates the result of the transformation calculation and transmits the result zero detector circuit 118 and over conductor 120 to data storage register 34. The result is then transferred over data bus 32 to central processing unit 30 and the appropriate flag signal is delivered to output 122.

Both the first and second modes of operation employ the A, B, and offset data storage registers in a nondestructive fashion. As a result, registers 38, 40, 42, 44, and 46 need not be reloaded for the transformation of each point (X, Y) in model data $P_m$. Only X register 34 and Y register 36 must be reloaded for each calculation, thereby increasing the speed at which data transform circuit 12 operates.

It will be obvious to those having skill in the art that many changes may be made in the above-described details of the preferred embodiment of the present invention without departing from the underlying principles thereof. The scope of the present invention should be determined, therefore, only by the following claims.

I claim:

1. In a controller for a graphics display system having a display screen on which is formed an image that represents an object and that has a preselected position and a preselected orientation on the display screen, the controller including a central processing unit that controls the operation of the graphics display system, a data transform circuit in communication with the central processing unit, comprising:

data storage means communicating with the central processing unit for storing model data corresponding to the object positioned in an original orientation at an origin, and for storing position data corresponding to a translation of the object from the origin to the preselected position and orientation data corresponding to a rotation of the object from the original orientation to the preselected orientation;

computing means receiving the model, position, and orientation data from the data storage means for computing a transformation from the model data into display data in accordance with the position and orientation data, the data storage means storing the model, position, and orientation data before the computing means commences the transformation; and data transform control means for controlling the transfer of data from the data storage means to the computing means, whereby the data transform control means employs a first set of data transfers whenever the orientation data represent a rotation by an integral multiple of a preselected angle and a second set of data transfers whenever the orientation data represent a rotation by a nonintegral multiple of the preselected angle.

2. The circuit of claim 1 in which the computing means includes a multiplier circuit in communication with an adder circuit.

3. The circuit of claim 2 in which the multiplier circuit employs a Booth multiplication algorithm.

4. The circuit of claim 1 in which each of the model, position, and orientation data is stored in a separate, dedicated data storage means.

5. The circuit of claim 1 in which the first set of data transfers includes a subset of the second set of data transfers.

6. The circuit of claim 1 in which the preselected angle is substantially equal to 90°.

7. A graphics display system, comprising:

central processing means for controlling the operation of the graphics display system;

a display screen on which an image is formed, the image representing an object and being rendered at a preselected position and in a preselected orientation on the display screen;

data storage means communicating with the central processing unit for storing model data corresponding to the object positioned in an original orientation at an origin, and for storing position data corresponding to a translation of the object from the origin to the preselected position and orientation data corresponding to a rotation of the object from the original orientation to the preselected orientation;

computing means receiving the model, position, and orientation data from the data stprage means for computing a transformation from the model data into display data in accordance with the position and orientation data, the data storage means storing the model, position, and orientation data before the computing means commences the transformation; and data transform control means for controlling the transfer of data from the data storage means to the computing means, whereas the data transform control means employs a first set of data transfers whenever the orientation data represent a rotation by an integral multiple of a preselected angle and a second set of data transfers whenever the orientation data represent a rotation by a nonintegral multiple of the preselected angle.

8. The system of claim 7 in which the computing means includes a multiplier circuit in communication with an adder circuit.

9. The system of claim 8 in which the multiplier circuit employs a Booth multiplication algorithm.

10. The system of claim 7 in which the computing means comprises a logic gate array implemented in an integrated circuit.

11. The system of claim 7 in which the first set of data transfers includes a subset of the second set of data transfers.

12. The system of claim 7 in which the preselected angle is substantially equal to 90°.

13. In a controller for a graphics display system having a display screen on which is formed an image that represents an object and that has a preselected position and orientation on the display screen, the controller including a central processing unit that controls the operation of the graphics display system and the display screen representing a preselected range of position coordinate values, a data transform circuit in communication with the central processing unit, comprising:

data storage means communicating with the central processing unit for storing model data corresponding to the object and for storing position data and orientation data corresponding to, respectively, the preselected position and orientation of the image on the display screen;

computing means receiving the model, position, and orientation data from the data storage means for computing a transformation from the model data into digital display data in accordance with the position and orientation data, the data storage means storing the model, position, and orientation data before the computing means commences the transformation and the digital display data including first and second bits having respective lesser and greater weighted values;

data transform control means for controlling the transfer of data from the data storage means to the computing means; and detection means receiving the digital display data for detecting when the second bit represents a predetermined signal level, whereby the predetermined signal level indicates whether the digital display data correspond to a value that is within the preselected range of position coordinate values corresponding to the display screen.

* * * * *